US007688013B2

(12) United States Patent
Frommer et al.

(10) Patent No.: US 7,688,013 B2
(45) Date of Patent: Mar. 30, 2010

(54) SYSTEM AND METHOD FOR CONTROLLING SPEED OF A CLOSURE MEMBER

(75) Inventors: Thomas P. Frommer, Mount Albert (CA); Wasim Tahir, Scarborough (CA)

(73) Assignee: Flextronics Automotive Inc., Ontario (CA)

( * ) Notice: Subject to any disclaimer, the term of this patent is extended or adjusted under 35 U.S.C. 154(b) by 522 days.

(21) Appl. No.: 11/471,564

(22) Filed: Jun. 21, 2006

(65) Prior Publication Data

US 2007/0296242 A1 Dec. 27, 2007

(51) Int. Cl.
*G05D 3/00* (2006.01)

(52) U.S. Cl. ....................... 318/466; 318/280; 318/283; 318/266

(58) Field of Classification Search ................. 318/266, 318/280, 282, 286, 432, 445, 443, 466, 458, 318/283
See application file for complete search history.

(56) References Cited

U.S. PATENT DOCUMENTS 5,039,925 A 8/1991 Schap
5,422,551 A * 6/1995 Takeda et al. ............... 318/265
5,436,539 A * 7/1995 Wrenbeck et al. ........... 318/265
5,714,853 A * 2/1998 Knab et al. ................. 318/265
5,774,046 A * 6/1998 Ishihara et al. .............. 340/438
5,872,436 A * 2/1999 Bergmann et al. .......... 318/286
5,917,296 A * 6/1999 Frey et al. .................... 318/268
6,249,097 B1 * 6/2001 Frey et al. .................... 318/257
6,298,295 B1 * 10/2001 Tyckowski ................... 701/49
6,366,042 B1 * 4/2002 Gerbetz ....................... 318/286
6,388,406 B1 * 5/2002 Kyrtsos ....................... 318/286
6,555,982 B2 * 4/2003 Tyckowski .................. 318/465
6,573,677 B2 * 6/2003 Gerbetz ....................... 318/445
6,704,471 B1 * 3/2004 Fowler et al. ................. 385/13
6,719,356 B2 * 4/2004 Cleland et al. ........... 296/146.8
6,806,664 B2 * 10/2004 Beishline .................... 318/280
6,946,853 B2 * 9/2005 Gifford et al. ............... 324/686
7,038,414 B2 * 5/2006 Daniels et al. .............. 318/466
7,067,996 B2 * 6/2006 Yamamoto ................... 318/55
7,095,200 B2 * 8/2006 Shinohara et al. ........... 318/469
7,259,532 B2 * 8/2007 Shinohara ................... 318/282
7,295,894 B2 * 11/2007 Anderson et al. ........... 700/275
7,307,395 B2 * 12/2007 Bouamra et al. ............ 318/445
7,346,272 B2 * 3/2008 Franzan ...................... 388/800
2003/0030299 A1 * 2/2003 Cleland et al. ........... 296/146.8
2003/0115803 A1 6/2003 Kidokoro
2004/0124662 A1 * 7/2004 Cleland et al. ........... 296/146.4
2004/0257010 A1 * 12/2004 Yamamoto ................... 318/55
2005/0011129 A1 * 1/2005 Vassy .......................... 49/339

(Continued)

FOREIGN PATENT DOCUMENTS

WO WO/02/087812 11/2002

*Primary Examiner*—Paul Ip
(74) *Attorney, Agent, or Firm*—Patton Boggs LLP; Joseph V. Colaianni

(57) ABSTRACT

A closure system for controlling speed of a closure member, where the closure system includes a controller for transitioning speed of a closure member being operated in response to an obstacle being sensed in the path of the closure member. In one embodiment, a linear speed control algorithm determines the speed transitioning. In response to sensing contact with an obstacle, the controller may use a conventional contact process to stop or reverse the closure member. The closure system provides for a higher closing velocity of the closure member than conventional closure systems.

31 Claims, 5 Drawing Sheets

U.S. PATENT DOCUMENTS

2005/0275363 A1* 12/2005 Honma et al. ............... 318/280
2006/0181108 A1* 8/2006 Cleland et al. ........... 296/146.4
2007/0003258 A1* 1/2007 Franzan ...................... 388/803
2007/0027587 A1* 2/2007 Pedemas et al. ................ 701/2

* cited by examiner

SYSTEM AND METHOD FOR CONTROLLING SPEED OF A CLOSURE MEMBER

BACKGROUND OF THE INVENTION

Vehicles and other structures use closure systems to automatically open and close closure members. Closure members of vehicles include, but are not limited to, lift gates, trunks, sunroofs, windows, doors, and other devices. The speeds at which the closure systems operate are generally at speeds that will result in minimal injury or damage to persons or objects if contacted by the moving closure member. While closure systems operate to automatically and safely open and close closure members, decreasing closure system cycle time while maintaining safe pinch forces is generally a goal as operators and users of vehicles, for example, tend to want fast operation. However, typical closure members are large in mass and, as a result of this large mass, it is important to maintain velocity of the closure members at a rate that will not produce excessive pinch force in the event of a collision with an obstacle, such as a person or object.

Conventional closure systems generally utilize obstacle detection for detecting when an obstacle is blocking a closure member from opening and closing. Because closure systems generally rely on contact sensing for detecting a collision with an obstacle, closure systems generally have a conventional maximum speed for opening and closing the closure member. For example, a conventional closure speed for a lift gate is approximately 200 millimeters per second. In other words, the closure system is operated slowly enough to ensure that pinch forces remain low enough to be safe to obstacles that are contacted by a moving closure member and the closure systems. Although the speeds are relatively slow, collision with an obstacle at these speeds can place significant strain on the closure system in reacting to a collision with the obstacle.

One technique for preventing a closure member from contacting an obstacle includes the use of a non-contact sensor that senses when an obstacle is in the path of a closure member. If the closure member is moving (i.e., being opened or closed), and the non-contact sensor senses that an obstacle is in the path of the moving closure member, then the closure member is stopped from moving or reversed in direction of movement. While the functions of stopping or reversing a closure member are practical in terms of preventing an obstacle from becoming injured or damaged, it is impractical for many everyday situations. For example, children quickly jumping into backseats, adults putting final groceries in the rear of the vehicles, or people moving objects into the path of closure members while the closure members are moving cause the closure systems to inconveniently stop or reverse direction. Once the closure member has stopped or reversed direction, a user controlling operation of the closure member must reinitiate the process for opening or closing the closure member. What is needed is a mechanism for increasing higher cycle rates while maintaining safety of operation of closure systems.

SUMMARY

To overcome the problems of (i) slowness of closure systems, (ii) collision detection of conventional closure systems, or (iii) functionality of closure systems that is inconvenient, the principles of the present invention provide for adaptive speed control based on proximity of an obstacle relative to a closure member. The adaptive speed control includes driving a closure member at a higher cycle rate than conventional closure systems and transitioning the speed of the closure member to a conventional speed or speed lower than conventional speeds to provide a "soft" contact, which causes a low pinch force at the time of contact. This technique includes the use of "look-ahead" sensing for obstacles using non-contact sensors, and uses a control algorithm for transitioning speed of the closure member from a first speed to a second speed.

In accordance with the principles of the present invention, an embodiment includes a closure system for controlling speed of a closure member. The closure system includes a closure member, a non-contact sensor configured to sense an obstacle in the path of the closure member and to generate an obstacle signal in response to sensing an obstacle. The closure system further includes a controller in communication with the non-contact sensor, the controller may be configured to control opening and closing the closure member and drive the closure member at a first speed while the obstacle signal is not being generated and transition to a second speed in response to the non-contact sensor generating the obstacle signal. In one embodiment, a linear speed control algorithm determines the speed transitioning. In response to sensing contact with an obstacle, the controller uses a conventional contact process by stopping or reversing the closure member.

In another embodiment, a method is used to control speed of a closure member. The process may include monitoring a path of a closure member for an obstacle. An obstacle signal may be generated in response to sensing an obstacle. The closure member may be driven at a first speed while an obstacle signal is not being generated and, in response to the obstacle signal being generated, the speed of the closure member may be transitioned to a second speed. The transitioning from the first speed to the second speed may be performed by using a linear speed control algorithm.

DETAILED DESCRIPTION OF THE DRAWINGS

Figure 1A:
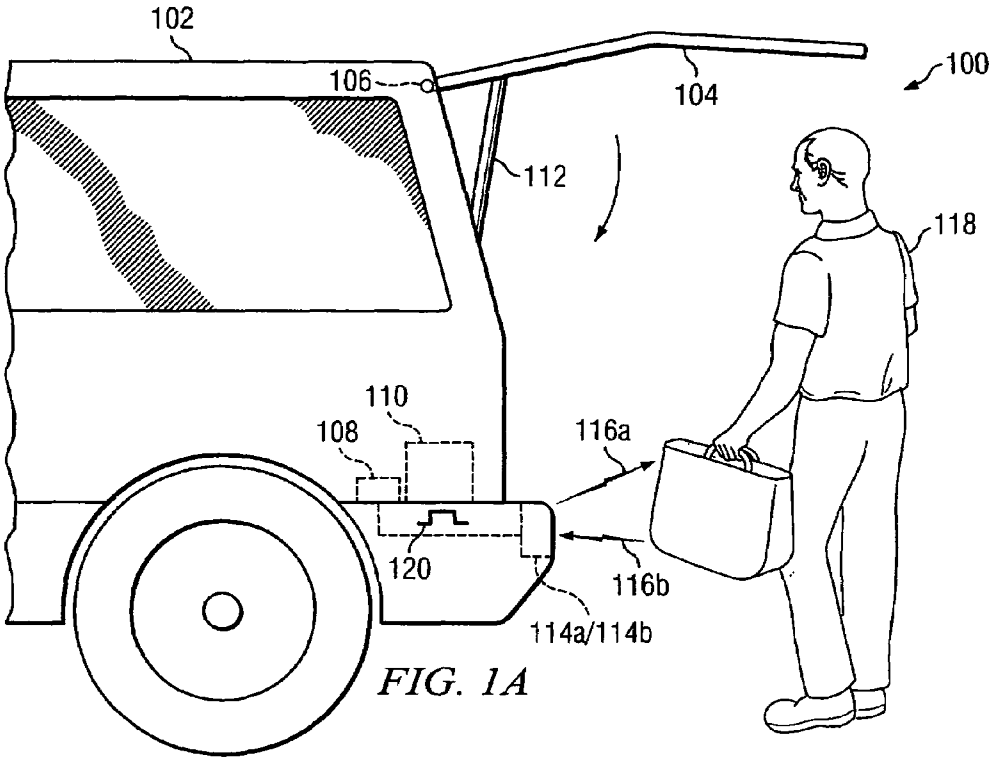
FIG. 1A is an illustration of an exemplary vehicle having a closure member controlled by a closure system.

FIG. 1A is an illustration of an exemplary vehicle 100 having a vehicle body 102 and closure member controlled by a closure system. In this embodiment, the closure member is a lift gate 104 that is coupled to the vehicle body 102 by one or more hinges 106. Although a lift gate is shown as the closure member in this embodiment, it should be understood that the principles of the present invention may be applied to any rotational or non-rotational closure system of a vehicle. Such closure members may include a trunk, lift gate, sliding door, window or other powered device. Still yet, closure systems that are used on structures other than vehicles are contemplated in accordance with the principles of the present invention. Such structures may include, but are not limited to, trains, airplanes, boats, buildings, or other structures. Closure members of these structures may include doors, windows, ladders, or other powered devices.

The lift gate 104 is controlled by a controller 108 for moving the lift gate 104 into open and closed positions. The controller 108 may drive a motor 110 that causes a cylinder 112 to push and pull on the lift gate 104. In one embodiment, the motor 110 is a hydraulic pump. Alternatively, the motor may be any other electromechanical actuator for causing the lift gate 104 to open and close. If the closure member is a window or other closure member, an electromechanical motor, such as a direct current (DC) or alternating current (AC) motor, may be utilized in accordance with the principles of the present invention. While the controller 108 is shown as a separate unit, the functionality may be integrated into processors used in other parts of the vehicle or structure.

Non-contact sensor 114*a*/114*b* may be located at the rear of the vehicle. In one embodiment, the non-contact sensors may be any non-contact sensor. For example, the non-contact sensor may include capacitive, ultrasonic, optical, thermal or other non-contact sensor as understood in the art. As shown, the non-contact sensor 114*a*/114*b* may output an incident signal 116*a* and receive a reflected signal 116*b* in response to the incident signal 116*a* reflecting from an obstacle 118 in the path of the lift gate 104.

In terms of being "in the path" of the closure member, an obstacle that is estimated to be in the direct path or relatively near the path of the closure member may be determined to be "in the path" of the closure member. If a sensing element (e.g., capacitive) that is less accurate is used, then being in the path may be less accurate than using a more accurate sensing element (e.g., optical). It should be understood that if a passive sensing element, such as a capacitive sensing element, is used then there are no incident and reflection signals 116*a* and 116*b*.

If the non-contact sensor 114*a*/114*b* senses an obstacle to be within the path of the closure member, then an obstacle signal 120 may be generated from the sensors and communicated to the controller unit 108. The obstacle signal may simply be a change in signal level being outputted from the obstacle sensor 114*a*/114*b*. In other words, if an obstacle signal is substantially OV and transitions to 5V, for example, that transition is indicative of an obstacle signal being generated.

Figure 1C:
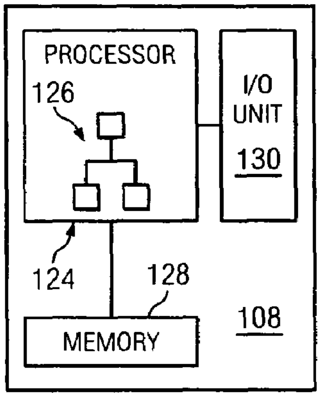
FIG. 1C is a block diagram of an exemplary controller for controlling a closure member.
Figure 1B:
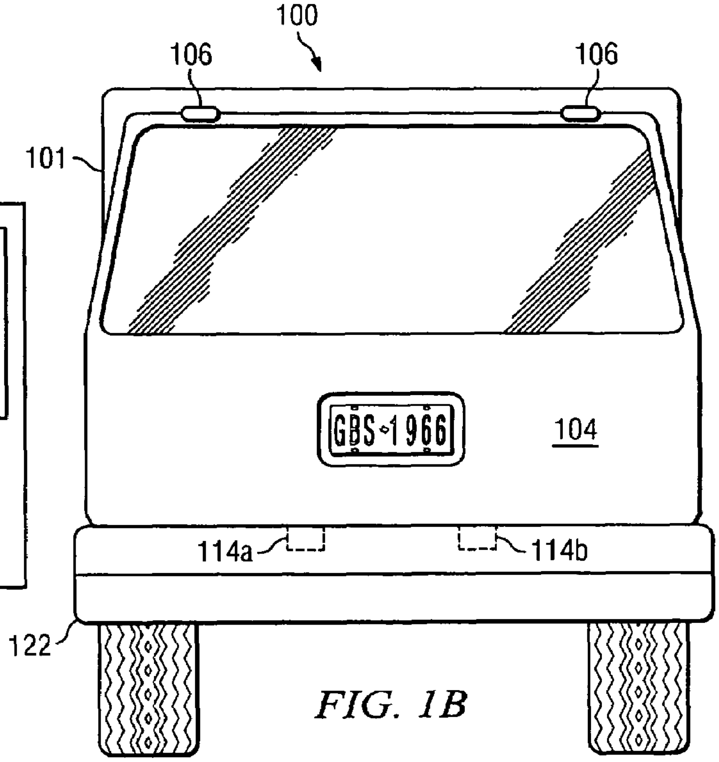
FIG. 1B is a rear view illustration of the exemplary vehicle showing non-contact sensors for sensing obstacles in the path of the closure member.

FIG. 1B is a rear view illustration of the exemplary vehicle showing the non-contact sensor 114*a*/114*b* for sensing obstacles in the path of the closure member. As shown, obstacle sensor 114*a*/114*b* is disposed on the rear of the vehicle. The obstacle sensor 114*a*/114*b* may be positioned on a rear bumper of the vehicle or located elsewhere, such as on the closure member (e.g., lift gate 104), vehicle body 102, or otherwise. It is also contemplated that multiple sensors can be used. For example, it is contemplated that a sensor can be mounted on a lift gate and also on the vehicle body. If located on the rear bumper 122, then the obstacle sensor 114*a*/114*b* may be used to sense when an obstacle is located in the path of the lift gate 104 both while opening and closing. Alternatively, if the obstacle sensor 114*a*/114*b* is located on the inside of the lift gate 104, then it may be limited to use while closing the lift gate 104.

The obstacle sensor 114*a*/114*b* as shown is formed of a transmitter to transmit the incident signal 116*a* and a receiver to receive the reflected signal 116*b*, as understood in the art. One or more of the same and/or different non-contact sensors that are capable of sensing an obstacle in the path of the closure member during opening and closing operations may be utilized in accordance with the principles of the present invention.

FIG. 1C is a block diagram of an exemplary controller for controlling a closure member. The controller 108 may include a processor 124 that executes software 126. The processor 124 may be a general-purpose processor, application specific integrated circuit (ASIC), digital signal processor (DSP), or any other device capable of executing the functionality of controlling the closure member. A memory 128 and input/output (I/O) unit 130 may be in communication with the processor 124. The memory 128 may be used to store software and parameters to operate the closure system and the I/O unit 130 may be used to drive an actuator for moving the closure member.

The software 126 may include control algorithms for controlling operation of one or more closure members in accordance with the principles of the present invention. It should be understood that the processor 124 may include one or more processors operating together or independently for controlling one or more closure members.

Figure 2:
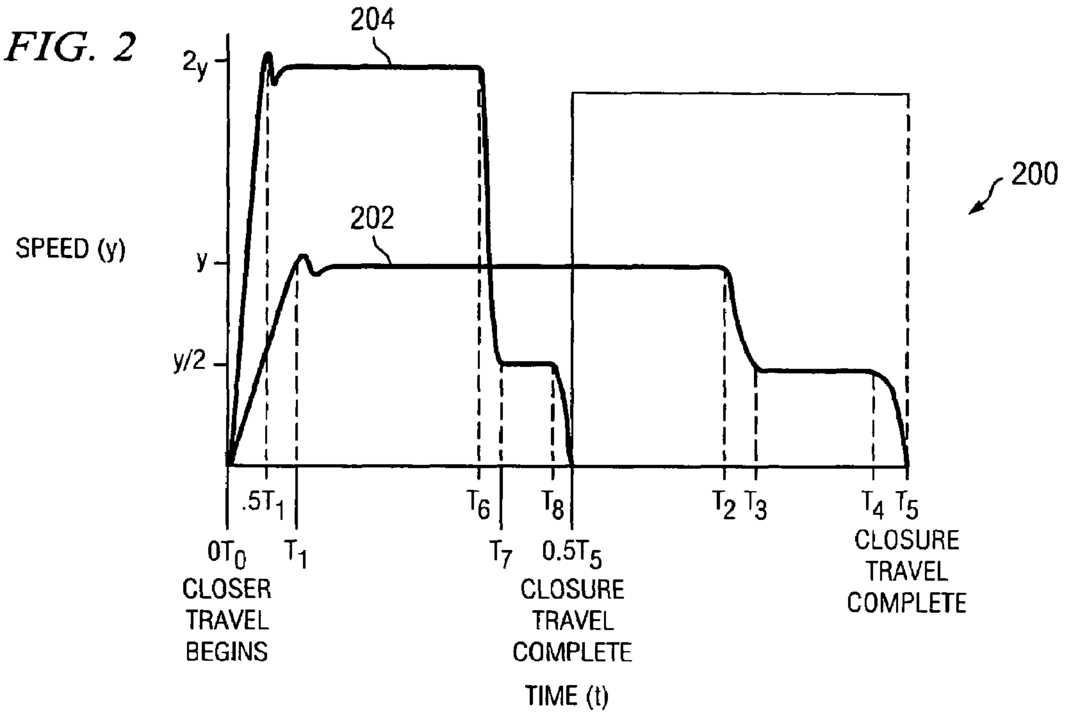
FIG. 2 is a graph showing an exemplary conventional speed control profile and an adaptive speed control profile having a higher cycle rate in accordance with the principles of the present invention.

FIG. 2 is a graph showing an exemplary conventional low speed control profile and an adaptive speed control profile having a higher cycle rate than the conventional low speed control profile in accordance with the principles of the present invention. Conventional low speed control profile 202 is shown for comparative purposes. The conventional low speed control profile transitions from a speed of 0 to a speed of y between times $T_0$ and $T_1$. Upon approaching closure or full open of the closure member at time $T_2$, the speed transitions from a speed of y to y/2 at time $T_3$. The conventional low speed control profile 202 continues to move the closure member at a speed of y/2 until time $T_4$, whereupon the speed transitions back to 0 at time $T_5$, The closure travel or open travel cycle is complete at that time.

Continuing with FIG. 2, an adaptive speed control profile 204 provides for higher open and close speeds relative to those of the conventional low speed control profile and low operation cycle times under normal operation. And, in the event of an obstacle being sensed in the path of a closure member, the adaptive speed control profile 204 allows for normal or even reduced pinch forces through a "look-ahead" reduction in velocity (see, FIG. 5). The algorithm is adaptive in that it is capable of changing operation in response to a changing environment during operation of the closure system. In the event that an obstacle sensor fails due to damage or otherwise, the controller may use a conventional or standard low speed control profile, which generally prevents excessive pinch forces.

As shown, the adaptive speed control profile 204 transitions between speeds of 0 to 2y between times $T_0$ and 0.5 $T_1$. This means that the speed of the closure member ramps to twice the speed using the adaptive speed control profile than the standard low speed control profile 202 in half the time.

Similarly, the speed of the closure member transitions between times $T_6$ and $T_7$ from a speed of 2y to y/2, which is the same speed as the closure speed produced by the standard low speed control profile 202 at time $T_3$. The adaptive speed control profile 204 continues at speed y/2 until time $T_8$, where it transitions to a speed of zero at time 0.5 $T_5$. The cycle time of the adaptive speed control profile 204 operates in half the operation cycle of the standard low speed control profile 202. It should be understood that alternative speed control profiles may be utilized in accordance with the principles of the present invention that are faster or slower than the standard low speed control profile 202 and provide for obstacle detection speed transitions.

Figure 3:
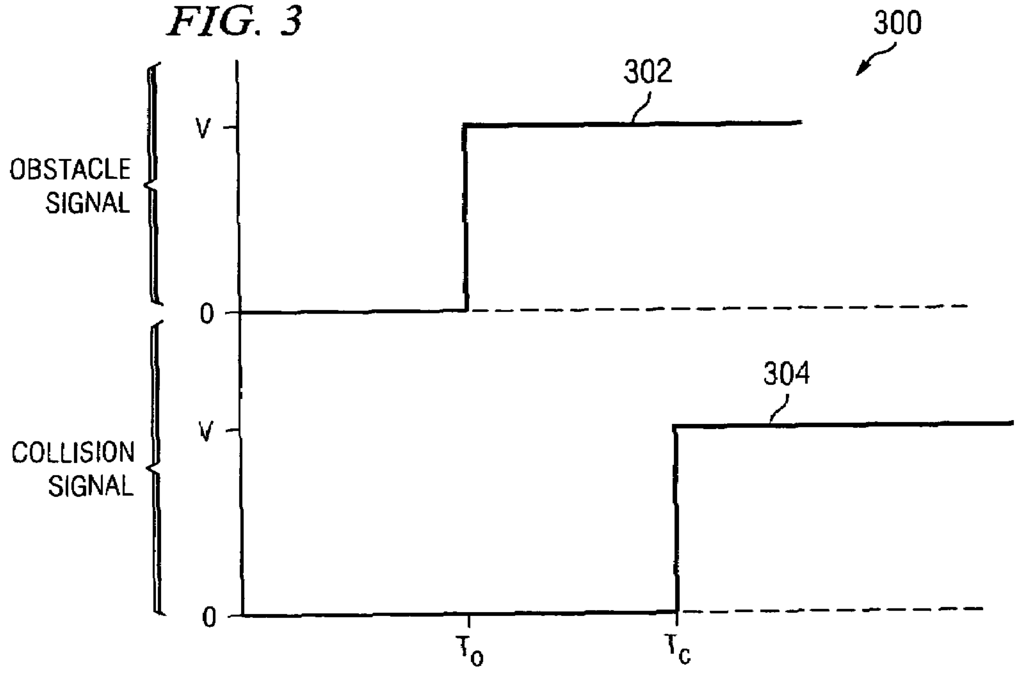
FIG. 3 is a graph showing exemplary signals for sensing an obstacle in the path of a closure member and collision of the closure member with the obstacle.

FIG. 3 is a graph 300 showing exemplary signals for sensing (i) an obstacle in the path of a closure member, and (ii) a collision of the closure member with the obstacle. As shown, an obstacle signal 302 initially does not sense an obstacle in the path of a closure member and outputs a 0 volt signal. At time $T_S$, an obstacle in the path of the closure member is sensed, which causes a transition of the obstacle signal 302 to a voltage V. This transition may be considered to be a generation of an obstacle signal. It should be understood that this obstacle signal 302 is one embodiment and that other or alternative signaling may be utilized to indicate that an obstacle is being sensed in the path of a closure member. The obstacle signal 302 and/or collision signal 304 may be digital or analog depending on the configuration of the electronics.

After the obstacle is sensed indicated by the obstacle signal 302 transitioning to a voltage V, a collision by the closure member may be sensed by a collision sensor, as understood in the art. The collision causes a transition of the collision signal 304 to occur at time $T_C$ to a voltage V. This collision signal 304 may be used by a controller to stop or reverse the closure member to avoid injuring or damaging the obstacle, as is conventionally performed.

Figure 4:
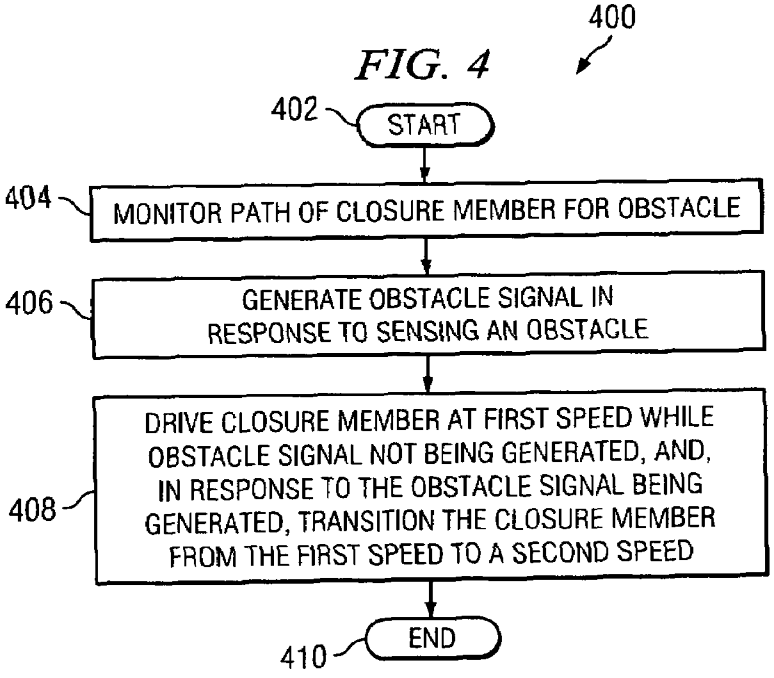
FIG. 4 is a flow diagram of an exemplary process to monitor for an obstacle in the path of a closure member and adaptively changing the speed of the closure member in response to sensing an obstacle in the path of the closure member.

FIG. 4 is a flow diagram of an exemplary process 400 to monitor for an obstacle in the path of a closure member and adaptively changing the speed of the closure member in response to sensing an obstacle in the path of the closure member. The monitoring process 400 starts at step 402. At step 404, a path of a closure member may be monitored for an obstacle. At step 406, an obstacle signal may be generated in response to sensing an obstacle. In generating the obstacle signal, a transition from low to high voltage may be generated, thereby indicating that an obstacle is being sensed in the path of a closure member. At step 408, the closure member may be driven at a first speed while the obstacle signal is not being generated and, in response to the obstacle signal being generated, the speed of the closure member may transition to a second speed, slower than the first speed. The monitoring process ends at step 410.

Figure 5:
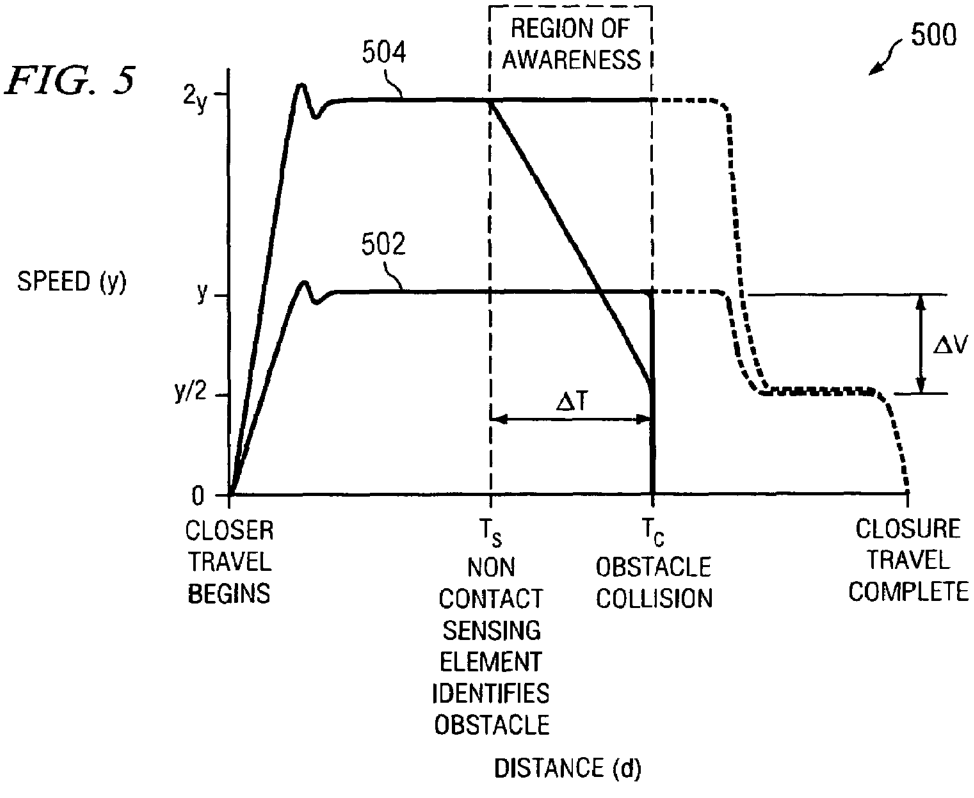
FIG. 5 is a graph showing a conventional speed control profile and an adaptive speed control profile in responding to sensing an obstacle in the path of a closure member.

FIG. 5 is a graph 500 showing a conventional low speed control profile 502 and adaptive speed control profile 504 in responding to an obstacle in the path of a closure member. A standard speed control profile 502 is shown with an adaptive speed control profile 504 to differentiate responses to sensing an obstacle in the path of the closure member and to contacting an obstacle by the closure member. As shown, the standard speed control profile 502, which includes obstacle collision sensing, initially ramps up to a speed of y and progresses along at that speed until a collision with an obstacle occurs, whereupon the closure member is stopped by the speed dropping sharply to 0.

The adaptive speed control profile 504, by contrast, ramps up to a speed of 2y and progresses along until time $T_6$, whereupon a non-contact sensor identifies an obstacle in the path of the closure member. This "look-ahead" capability detects the presence of the obstacle in the path of the closure member prior to colliding with the closure member. This sensing creates a "region of awareness" ΔT that is relative to the "look-ahead" range of the sensing element. In the region of awareness, the closure system is aware of the obstacle, and has time to react before contact. The closure system may reduce its speed at a rate of change that is proportional to the distance from the obstacle. In one embodiment, the rate of change is linear. Alternatively, the closure system may use a non-linear controller to change the rate of speed relative to the distance from the obstacle. As shown, the adaptive speed control profile 504 transitions from a speed of 2y at time $T_S$ substantially linearly to a speed of y/2 at time $T_C$. At time $T_C$, an obstacle collision is detected by the closure system and the closure member is stopped. It should be noted that the adaptive speed control profile 504 is moving at a speed half of the speed of the standard low speed control profile 502 when the collision of the closure member occurs with the obstacle at time $T_C$. This slower speed is considered to be a "soft" collision between the two objects. Because the speed at the time of collision is reduced by the use of the adaptive speed control profile 504, pinch forces are significantly reduced and stress on the closure system by either contacting an obstacle at a speed of y (i.e., twice the speed) or a high speed reversal is also decreased. Reducing the stresses on the closure system potentially extends operational life of the closure system.

In reducing the speed of the closure member during the region of awareness, various speed distance algorithms may be utilized. These algorithms may be linear or non-linear, depending on the control desired and the closure member being controlled. In one embodiment, the speed distance algorithm may be defined by the following equation:

$$V=V1\times(1-K\times X/X1)\text{, where}$$

V=instantaneous speed at X;
V1=initial speed;
X1=initial distance from obstacle;
X=instantaneous distance; and
K=proportionality constant Although not shown in the adaptive speed control profile 504, if the obstacle is removed from the path of the closure member before the closure member is stopped, then the system may utilize the speed control algorithm as defined above to speed up the closure member until it reaches the maximum speed (e.g., 2y) to continue along its path of travel. It should be understood that a different control algorithm may be used to increase the speed of the closure member, such as a ramp or spline used at the start of movement of the closure member from time $T_0$. Once the closure member has completed its travel, the closure member may be cinched or latched into place and the closure system may be put into a sleep mode or otherwise until a power cycle to move the closure member is initiated again. In one embodiment, see FIG. 6, a minimum speed Vf may be set such that the slowest speed allowed by the system is Vf. This minimum speed Vf may be configured using software, and is slow enough to reduce pinch force. For example, minimum speed Vf may be set to 5 or other value less than the slowest contact speed of conventional closure systems. Regardless of the proportionality constants, closure member may continue to move at speed Vf until it contacts the obstacle and the braking begins.

Figure 6:
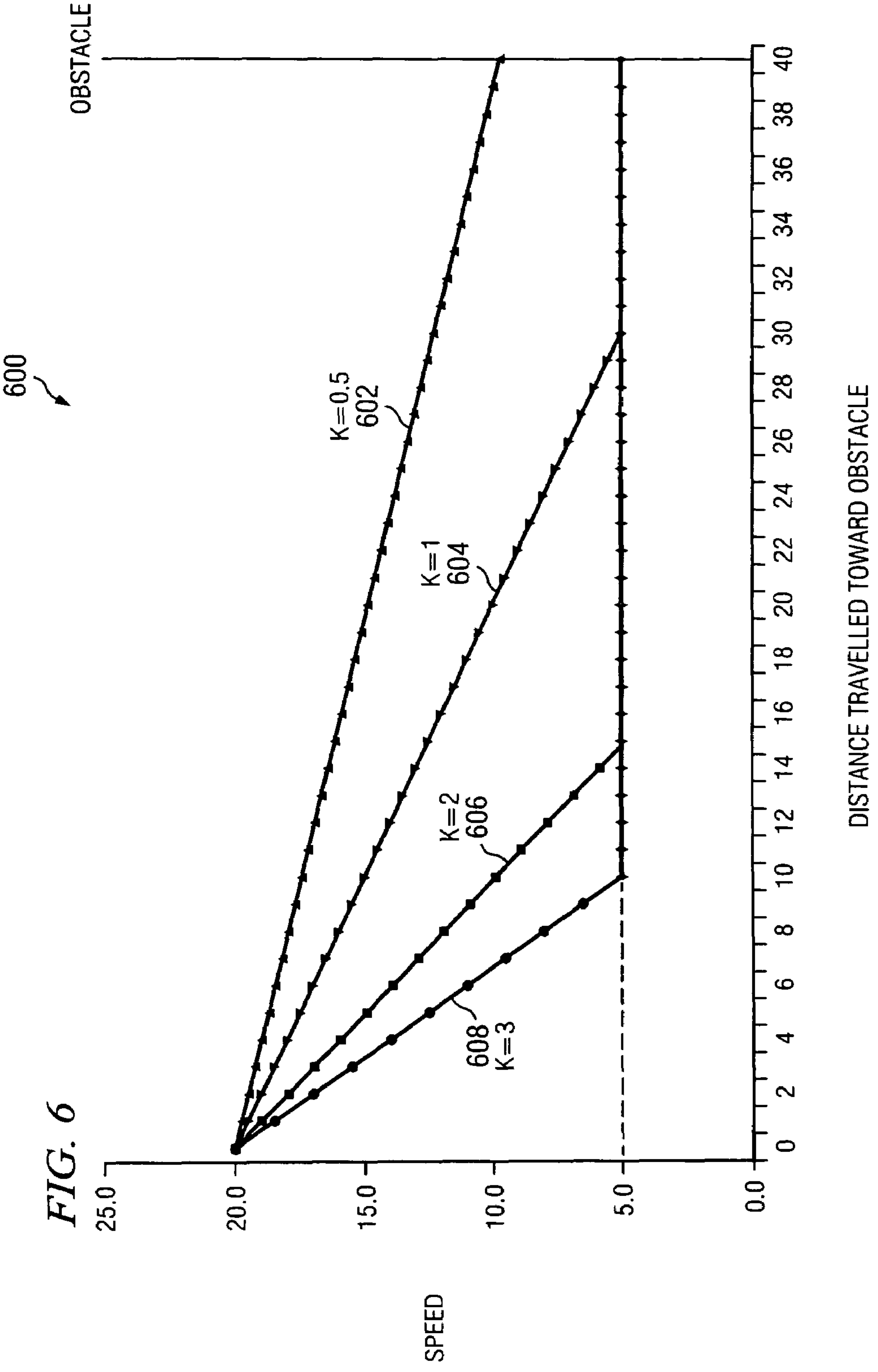
FIG. 6 is a graph showing a number of speed control profiles using different values of a proportionality constant in an exemplary linear speed control algorithm.

FIG. 6 is a graph showing a number of speed control profiles 602, 604, 606 and 608 with different proportionality constants. As shown, the various speed control profiles 602-606 can be generated through the manipulation of the proportionality constant K, thereby allowing for behavior of the closure system to be configured as desired. In this example, the curves each start with an initial velocity of V1=20 and initial distance X1 to the obstacle of 40. The proportionality constant K is set at 0.5 for curve 600, 1.0 for curve 604, 2.0 for curve 606, and 3.0 for curve 608.

When K=0.5, transition of the initial speed from 20 decreases relatively slowly, such that the speed is 10 when contacting the obstacle. If the proportionality constant is higher than 1, then the closure member ramps down until it reaches a minimum speed Vf and contacts the obstacle, as shown by curves K=1, K=2 and K=3. It should be understood that a proportionality constant may be selected by the manufacturer as desired, or the manufacturer may provide operators with control over the proportionality constant K via a switch, knob, or other control mechanism as understood in the art. In providing the control to an operator, rather than describing that control mechanism as affecting a proportionality constant K, it may be described as child or adult setting, for example. For example, a child setting would not avoid the closure member from contacting the obstacle (i.e., K>1.0). However, it would prepare the closure member for contacting at a greater distance from the obstacle. On the other hand the adult setting would allow the closure member to provide closure to the obstacle before Vf.

Figure 7:
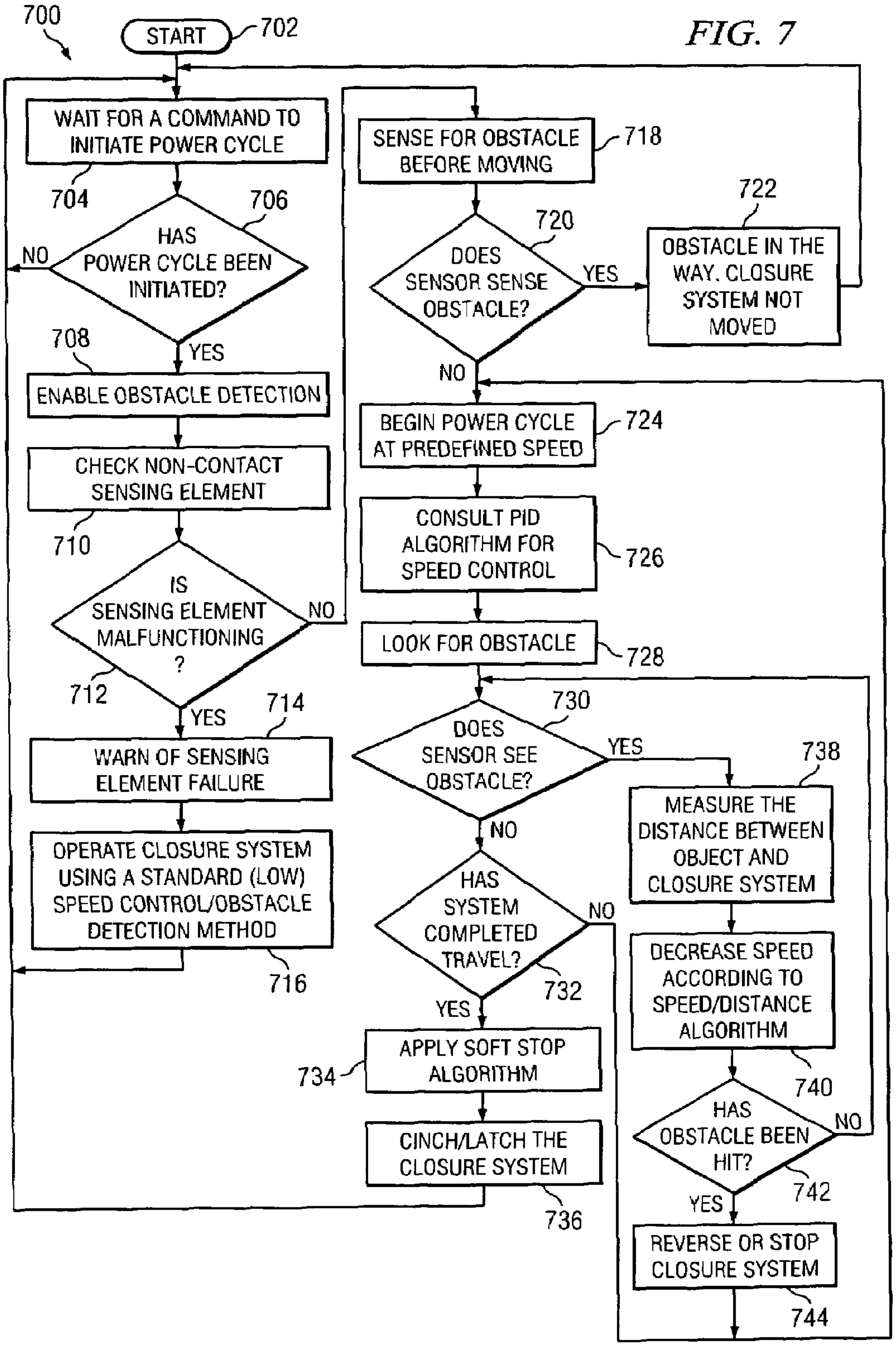
FIG. 7 is a flow diagram of a more detailed process for controlling a closure member in accordance with the principles of the present invention.

FIG. 7 is a flow diagram of a more detailed adaptive speed control process 700 for controlling a closure member in accordance with the principles of the present invention. The adaptive speed control process 700 starts at step 702. At step 704, the process waits for a command to initiate a power cycle for controlling the closure member. The command may be given by a driver of a vehicle by pushing a button or switch in the vehicle or on a remote control, for example. At step 706, a determination is made as to whether a power cycle has been initiated. If not yet initiated, then the process returns to step 704 until a power cycle has been initiated. Upon determination that the power cycle has been initiated at step 706, the process continues at step 708, whereupon obstacle detection is enabled.

At step 710, a non-contact sensing element or sensor is checked. If it is determined at step 712 that the sensing element is malfunctioning, then the process continues at step 714, where a warning that the sensing element is malfunctioning is reported. In the case of the closure system being in a vehicle, the warning may be provided to a driver of the vehicle via a visual and/or audio signal. At step 716, the closure system uses a standard (low) speed control/obstacle detection method. This operation may be used to operate the closure member as shown in FIG. 5, in one embodiment. Upon completion of the operation of opening or closing the closure member, the process continues at step 704.

If it is determined that the non-contact sensing element is not malfunctioning at step 712, then at step 718, prior to moving the closure member, the sensing element senses the path of the closure member prior to a closure system moving the closure member. A determination is made at step 720 as to whether the non-constant sensor senses an obstacle in the path of the closure member. If so, then at step 722, a determination is made that an obstacle is in the path of the closure member and the closure system prevents the closure member from moving. The process continues at step 704.

If the obstacle sensor does not sense an obstacle in the path of the closure member at step 720, then the process continues at step 724 where the closure member begins a "power cycle" at a predefined speed. This may be seen on FIG. 5 as the adapted speed control profile 504 ramps from 0 to 2y between times $T_o$ and 0.5 $T_1$, where the predefined speed reaches 2y. It should be understood that other transitions or predefined speeds may be utilized in accordance with the principles of the present invention. At step 726, a control algorithm may be utilized for speed control. In one embodiment, the control algorithm is a PID controller. Other control algorithms may be utilized for controlling the speed of the closure member in accordance with the principles of the present invention. At step 728, the non-contact sensor may continue to sense for an obstacle that enters the path of the closure member. At step 730, a determination is made as to whether the non-constant sensor senses an obstacle in the path of the closure member. If not, then at step 732, a determination is made if the closure member has completed travel. If not, then the process may continue at step 724. Otherwise, if the closure member has completed travel, then the process may continue at step 734 and a "soft" stop algorithm may be applied, and the closure member is cinched and/or latched at step 736. The process repeats at step 704.

If at step 730, the obstacle sensor senses an obstacle in the path of the closure member, then at step 738, a measurements between the distance of the obstacle and the closure member is made. At step 740, speed of the closure member is decreased in accordance with a speed/distance algorithm. In one embodiment, the speed/distance algorithm may be that of the speed control profile described with respect to transition of the speed of the closure member in the region of awareness shown in FIG. 5. At step 742, a determination is made as to whether the obstacle has been contacted by the closure member. If not, the process may repeat back at step 730, where a determination is made as to whether the obstacle remains in the path of the closure member. If the obstacle is removed from the path of the closure member (e.g., a person or object moves out of the way of the closure member), then the depth of speed control algorithm may increase the speed to the maximum level (e.g., 2y). If it has been determined at step 742 that the obstacle has been contacted by the closure member, then at step 744, the closure system may stop or reverse the direction of the closure member at step 744, and the process may stop or reverse at step 724. Accordingly, the specific flow or operations of the process 700 may be altered and accommodate the principles of the present invention.

The previous detailed description is of a small number of embodiments for implementing the invention, it is not intended to be limiting in scope. One of skill in this art will immediately envisage the methods and variations used to implement this invention in other areas than those described in detail. The following claims set forth a number of the embodiments of the invention disclosed with greater particularity.

The invention claimed is:

1. A system for controlling speed of a closure system, comprising:

a closure member;

a non-contact sensor configured to sense an obstacle in the path of the closure member and to generate an obstacle signal in response to sensing the obstacle; and a controller in communication with the non-contact sensor, the controller configured to:

control opening and closing of the closure member, drive the closure member at a first speed while the obstacle signal is not being generated, determine a distance between the obstacle and the closure member;

calculate a transition speed based on the distance in response to the non-contact sensor generating the obstacle signal;

drive the closure member at the transition speed to a second speed in response to the non-contact sensor generating the obstacle signal.

2. The system according to claim 1, wherein the controller is configured to substantially linearly transition to the second speed in response to the obstacle signal being generated while the controller is driving the closure member at the first speed.

3. The system according to claim 1, wherein the controller is further configured to stop or reverse the closure member in response to the closure member contacting the obstacle.

4. The system according to claim 1, wherein the first speed is a predefined speed.

5. The system according to claim 1, wherein the transition speed is determined by a speed/distance algorithm.

6. The system according to claim 5, wherein the speed/distance algorithm is V=V1×(1−K×X/X1), where V1 is an initial speed, X1 is an initial distance from the obstacle, X is an instantaneous distance, and K is a proportionality constant.

7. The system according to claim 5, wherein the speed/distance algorithm is linear.

8. The system according to claim 5, wherein the speed/distance algorithm is non-linear.

9. The system according to claim 1, wherein the controller is further configured to determine if the non-contact sensor is malfunctioning and, if so, operating the closure member using a standard, low speed control algorithm.

10. The system according to claim 9, wherein the first speed is at least twice as fast as a maximum speed of the standard, low speed control algorithm.

11. The system according to claim 1, wherein the second speed is approximately four times less than the first speed.

12. The system according to claim 1, wherein the closure member is a lift gate.

13. The system according to claim 1, wherein the closure member is a sliding door.

14. The system according to claim 1, wherein the non-contact sensor is a capacitive sensor.

15. The system according to claim 1, wherein the closure member is connected to a vehicle.

16. A method for controlling speed of a closure system, comprising:

monitoring a path of a closure member for an obstacle;

generating an obstacle signal in response to sensing an obstacle;

driving the closure member at a first speed while the obstacle signal is not being generated;

determining a transition speed for the closure member based on the distance between the closure member and the obstacle; and in response to the obstacle signal being generated, driving the closure member at the transition speed to a second speed.

17. The method according to claim 16, wherein driving the closure member at a first closure speed is performed at a predetermined rate.

18. The method according to claim 16, wherein transition speed is determined by a speed/distance algorithm.

19. The method according to claim 18, wherein the speed/distance algorithm is V=V1×(1−K×X/X1), where V1 is an initial speed, X1 is an initial distance from an obstacle, X is an instantaneous distance, and K is a proportionality constant.

20. The method according to claim 16, further comprising sensing contact by the closure member with the obstacle and stopping or reversing the closure member in response to sensing contact.

21. The method according to claim 16, further comprising determining if the monitoring is malfunctioning and, if so, driving the closure member at a standard, low speed.

22. The method according to claim 21, wherein driving the closure member at the first speed is at least twice as fast as the standard, low speed.

23. The method according to claim 16, wherein driving the closure member at the second speed is approximately four limes less than the first speed.

24. The method according to claim 18, wherein the speed/distance algorithm is linear.

25. The method according to claim 23, wherein driving the closure member includes driving a lift gate.

26. The method according to claim 18, wherein the speed/distance algorithm is non-linear.

27. The method according to claim 25, wherein driving the closure member includes driving a sliding door.

28. The method according to claim 16, wherein monitoring the path of the closure system includes using a non-contact sensor.

29. The method according to claim 23, wherein monitoring the path of the closure system includes using an active, non-contact sensor.

30. The method according to claim 16, wherein monitoring includes monitoring the path of a closure member connected to a vehicle.

31. A system for controlling speed of a closure system, comprising:

closure means;

means for sensing a distance of an obstacle from the closure means;

means for generating an obstacle signal in response to sensing an obstacle;

means for driving the closure means at a first speed with the obstacle signal is not being generated;

means for determining a transition speed for the closure member based on the distance between the closure member and the obstacle; and in response to the obstacle signal being generated, means for driving the closure means at the transition speed to a second speed.

* * * * *